United States Patent
Kondou

(10) Patent No.: US 11,327,460 B2
(45) Date of Patent: May 10, 2022

(54) ENCODER

(71) Applicant: FANUC CORPORATION, Yamanashi (JP)

(72) Inventor: Youhei Kondou, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 48 days.

(21) Appl. No.: 16/364,780

(22) Filed: Mar. 26, 2019

(65) Prior Publication Data

US 2019/0332087 A1    Oct. 31, 2019

(30) Foreign Application Priority Data

Apr. 27, 2018   (JP) .............................. JP2018-086750

(51) Int. Cl.
*G05B 19/406*    (2006.01)
*G05B 19/408*    (2006.01)

(52) U.S. Cl.
CPC ....... *G05B 19/406* (2013.01); *G05B 19/4083* (2013.01); *G05B 2219/37167* (2013.01); *G05B 2219/37535* (2013.01)

(58) Field of Classification Search
CPC ........ G05B 19/406; G05B 2219/37535; G05B 2219/37167; G05B 19/4083
See application file for complete search history.

(56) References Cited

U.S. PATENT DOCUMENTS 6,243,023 B1 *  6/2001  Katagiri ................. G01D 3/022
                                                        318/661
2013/0297238 A1 * 11/2013 Kamiya ............... G01R 21/133
                                                        702/60

(Continued)

FOREIGN PATENT DOCUMENTS

CN    104009679 A    8/2014
CN    104348384 A    2/2015
(Continued)

OTHER PUBLICATIONS

An Office Action; "Notification of Reasons for Refusal," mailed by the Japanese Patent Office dated Mar. 17, 2020, which corresponds to Japanese Patent Application No. 2018-086750 and is related to U.S. Appl. No. 16/364,780 with English language translation.

(Continued)

*Primary Examiner* — Kawing Chan
*Assistant Examiner* — Bradley R Brown
(74) *Attorney, Agent, or Firm* — Studebaker & Brackett PC

(57) ABSTRACT

It is an object of the present invention to provide an encoder that is easier to use.

An encoder 1 used in a numerical control device includes a signal generation unit configured to generate a digital signal, and a configuration information output unit configured to output configuration information that determines operation of the signal generation unit, in which the configuration information output unit includes a voltage level acquisition unit that acquires a voltage level to be input, a configuration information selection unit that selects configuration information according to the acquired voltage level among a plurality of types of configuration information, and a configuration information transmission unit that transmits the selected configuration information to the signal generation unit.

4 Claims, 3 Drawing Sheets

(56) References Cited

U.S. PATENT DOCUMENTS

| | | | | |
|---|---|---|---|---|
| 2015/0035465 A1* | 2/2015 | Kibe | ................. | G01D 5/24457 318/490 |
| 2016/0233800 A1 | 8/2016 | Fukuta et al. | | |
| 2021/0064006 A1* | 3/2021 | Kiribuchi | ............ | H02P 23/0027 |

FOREIGN PATENT DOCUMENTS

| | | |
|---|---|---|
| CN | 105099327 A | 11/2015 |
| JP | H0914993 A | 1/1997 |
| JP | H11178303 A | 7/1999 |
| JP | 2006-311719 A | 11/2006 |
| JP | 2011-64470 A | 3/2011 |
| JP | 2016146701 A | 8/2016 |

OTHER PUBLICATIONS

An Office Action mailed by China National Intellectual Property Administration dated Oct. 13, 2020, which corresponds to Chinese Patent Application No. 201910338119.2 and is related to U.S. Appl. No. 16/364,780 with English language translation.

* cited by examiner

ENCODER

This application is based on and the benefit of priority from Japanese Patent Application No. 2018-086750, filed on 27 Apr. 2018, the content of which is incorporated herein by reference.

BACKGROUND OF THE INVENTION

Field of the Invention

The present invention relates to an encoder.

Related Art

There is known an encoder with an integrated circuit (large-scale integration (LSI) circuit) that operates by being configured using a DIP switch or another type of pin. With this type of encoder, the operation of the LSI circuit can be controlled by configuring, with the pin, the operation of the LSI circuit.

In recent years, encoders have become smaller and smaller to meet demands. However, an LSI circuit that includes configuration pins can only be made so small. As such, there is a limit as to how small an encoder can be made when using an LSI circuit. In light of this, there has been proposed a control device including a system (microcontroller) and an LSI circuit (see, for example, Patent Document 1).

Patent Document 1: Japanese Unexamined Patent Application, Publication No. 2016-146701

SUMMARY OF THE INVENTION

As described in Patent Document 1, when the microcontroller and the LSI circuit are configured as separate components, the microcontroller stores a program that includes configuration information for configuring operation of the LSI circuit. The microcontroller sends the configuration information to the LSI circuit by executing the program. The LSI circuit operates on the basis of the sent configuration information. As a result, the encoder operates on the basis of the configuration information. Through configuring the microcontroller and the LSI circuit as separate components, the LSI circuit can be made smaller and, in turn, the encoder can be made smaller.

However, an LSI circuit will operate differently for different types of encoders, and hence the program stored in the microcontroller must also be made different for different types of encoders. In other words, different types of programs for different types of encoders must be written into the microcontroller. As a result, an edited version for each particular program must be created if a program needs to be edited. In addition, the different programs need to be written into the microcontroller when the encoder is manufactured, and this results in additional man-hours for writing in the correct program. In light of the above, there is a need for an encoder that is easier to use.

It is an object of the present invention to provide an encoder that is easier to use.

(1) The present invention is an encoder (for example, an encoder 1 to be described later) used in a numerical control device, the encoder including a signal generation unit (for example, a signal generation unit 10 to be described later) configured to generate a digital signal, and a configuration information output unit (for example, a configuration information output unit 20 to be described later) configured to output configuration information that determines operation of the signal generation unit, the configuration information output unit including a voltage level acquisition unit (for example, a voltage level acquisition unit 21 to be described later) that acquires a voltage level to be input, a configuration information selection unit (for example, a configuration information selection unit 23 to be described later) that selects configuration information according to the acquired voltage level among a plurality of types of configuration information, and a configuration information transmission unit (for example, a configuration information transmission unit 24 to be described later) that transmits the selected configuration information to the signal generation unit.

(2) In the encoder according to (1), the configuration information selection unit may select configuration information including a number of periodic signals per rotation generated by a code disk in the encoder.

(3) In the encoder according to (1) or (2), the voltage level acquisition unit may acquire a plurality of voltage levels to be input, and the configuration information selection unit may select configuration information according to a combination of the plurality of voltage levels.

(4) The encoder according to any one of (1) to (3) may further include a configuration information storage unit (for example, a configuration information storage unit 22 to be described later) that stores configuration information corresponding to the voltage level to be acquired.

According to the present invention, an encoder that is easier to use can be provided.

DETAILED DESCRIPTION OF THE INVENTION

Figure 1:
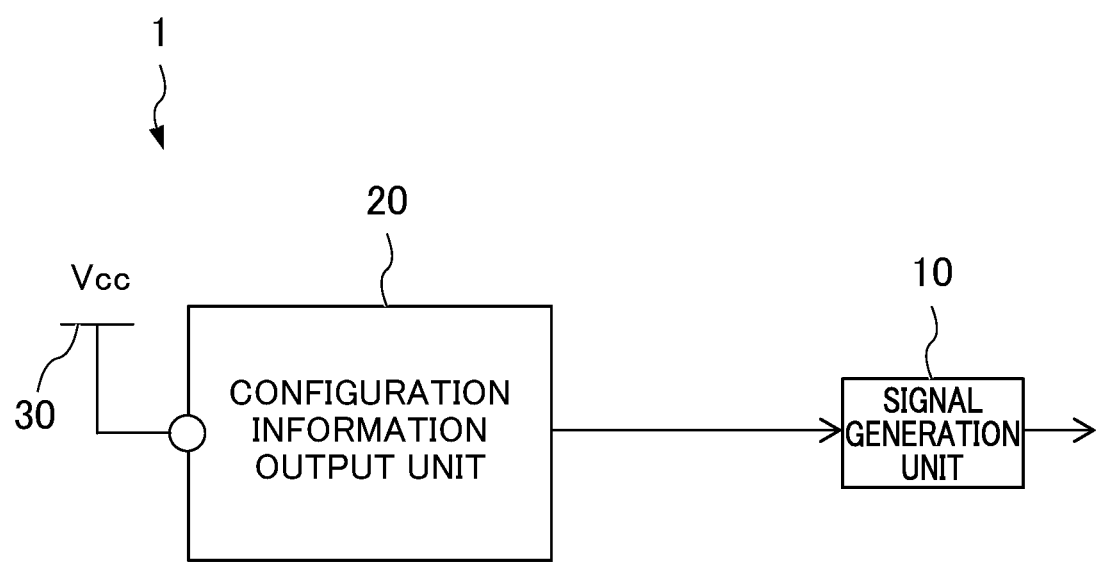
FIG. 1 is a schematic diagram illustrating the configuration of an encoder according to an embodiment of the present invention.
Figure 2:
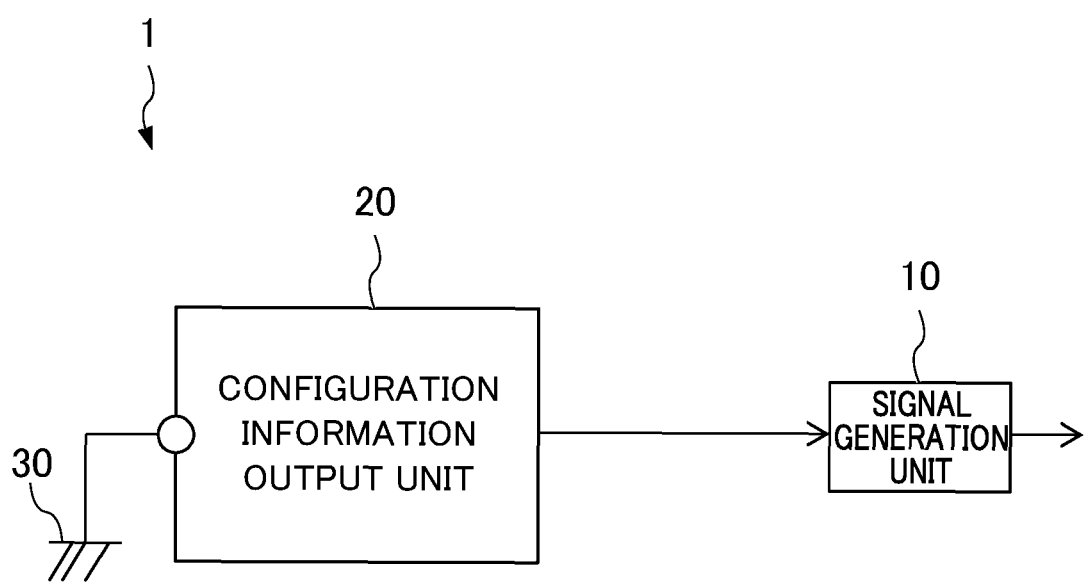
FIG. 2 is a schematic diagram illustrating another configuration of the encoder according to the embodiment.
Figure 3:
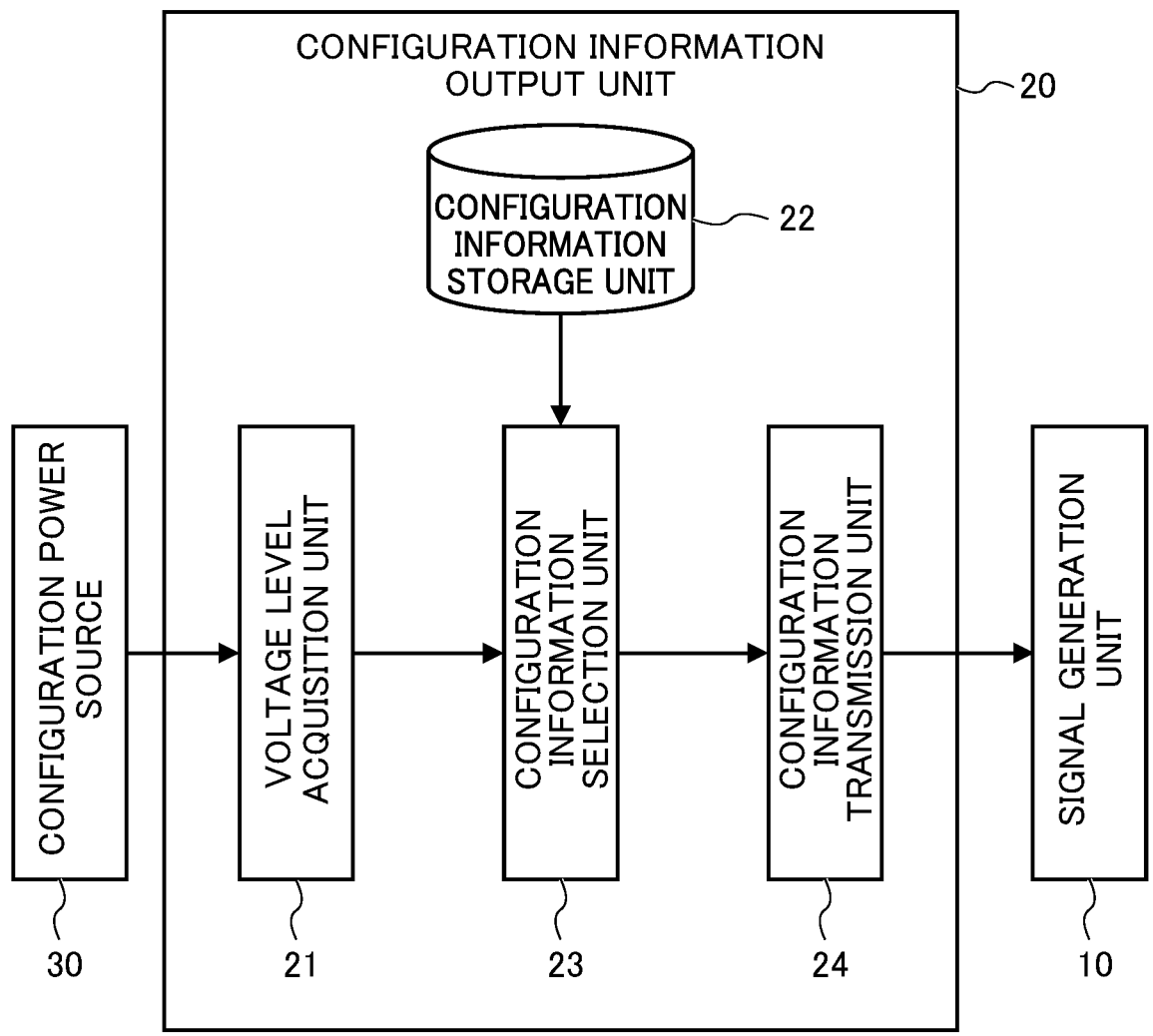
FIG. 3 is a block diagram illustrating the configuration of the encoder according to the embodiment.

An encoder 1 according to an embodiment of the present invention is described below with reference to FIGS. 1 to 3. The encoder 1 according to this embodiment is, for example, a rotary encoder. The encoder 1 is used in a numerical control device. As illustrated in FIGS. 1 and 2, the encoder 1 includes a signal generation unit 10 and a configuration information output unit 20. These components are used for processing signals.

In this embodiment, the signal generation unit 10 is a large-scale integrated circuit (LSI circuit). The signal generation unit 10 is a device that converts angular velocity and other information regarding a motor (not shown) obtained from the numerical control device (not shown) into a digital signal. The signal generation unit 10 operates according to preset configuration information. For example, the signal generation unit 10 operates on the basis of configuration information, such as the number of bits (2 or 4) in a signal used for determining the type of an A/D converter (not shown), the number of slits in a circular slit plate (not shown), whether or not positional data on an angle has been corrected, or the pole of the motor (not shown).

In this embodiment, the configuration information output unit 20 is a microcontroller. The microcontroller executes a common program for all types of encoders to thereby operate as the configuration information output unit 20. The configuration information output unit 20 is connected to the signal generation unit 10. The configuration information output unit 20 is also connected to a configuration power source 30 that outputs a predetermined voltage level. As illustrated in FIG. 1, the configuration information output unit 20 is connected to the configuration power source 30 that outputs, for example, a voltage level Vcc. Alternatively, as illustrated in FIG. 2, the configuration information output unit 20 is connected to the configuration power source 30 that outputs, for example, a voltage level at a ground potential. The configuration information output unit 20 outputs configuration information for determining operation of the signal generation unit 10. The configuration information output unit 20 outputs the configuration information that corresponds to, for example, the predetermined voltage level to the signal generation unit 10. As illustrated in FIG. 3, the configuration information output unit 20 includes a voltage level acquisition unit 21, a configuration information storage unit 22, a configuration information selection unit 23, and a configuration information transmission unit 24.

The voltage level acquisition unit 21 acquires the voltage level to be input. More specifically, the voltage level acquisition unit 21 acquires the voltage level of the configuration power source 30. The voltage level acquisition unit 21 sends a high-level or a low-level signal to the configuration information selection unit 23 according to the acquired voltage level.

The configuration information storage unit 22 stores configuration information that corresponds to the voltage levels to be acquired. The configuration information storage unit 22 stores configuration information that corresponds to, for example, a high-level voltage level. Alternatively, the configuration information storage unit 22 stores configuration information that corresponds to, for example, a low-level voltage level. In other words, the configuration information storage unit 22 stores a plurality of types of configuration information corresponding to different voltage levels.

The configuration information selection unit 23 acquires a signal that corresponds to the voltage level from the voltage level acquisition unit 21. The configuration information selection unit 23 selects the configuration information that corresponds to the acquired voltage level from among the plurality of types of configuration information. When a high-level signal is acquired from the voltage level acquisition unit 21, the configuration information selection unit 23 selects the configuration information that corresponds to the high-level signal. When a low-level signal is acquired from the voltage level acquisition unit 21, the configuration information selection unit 23 selects the configuration information that corresponds to the low-level signal. For example, the configuration information selection unit 23 selects configuration information that includes a number of periodic signals per rotation generated by a code disc (not shown) of the encoder 1. Specifically, the configuration information selection unit 23 selects configuration information that includes the number of slits in the circular slit plate of the encoder 1. The configuration information selection unit 23 sends the selected configuration information to the configuration information transmission unit 24. The configuration information transmission unit 24 sends the selected configuration information to the signal generation unit 10.

Next, operation of the encoder 1 is described. First, when the encoder 1 is turned on, configuration information is output from the configuration information output unit 20 to the signal generation unit 10. The signal generation unit 10 operates on the basis of the output configuration information.

As illustrated in FIG. 1, if the voltage level Vcc (high-level) is acquired from the configuration power source 30 by the voltage level acquisition unit 21, the voltage level acquisition unit 21 sends a high-level signal to the configuration information selection unit 23. Then, the configuration information selection unit 23 selects the configuration information that corresponds to a high level from the configuration information storage unit 22. The configuration information selection unit 23 sends the selected configuration information to the configuration information transmission unit 24. The configuration information transmission unit 24 sends the configuration information to the signal generation unit 10. The signal generation unit 10 operates on the basis of the sent configuration information.

On the other hand, as illustrated in FIG. 2, if a voltage level at a ground potential (low-level) is acquired from the configuration power source 30 by the voltage level acquisition unit 21, the voltage level acquisition unit 21 sends the low-level signal to the configuration information selection unit 23. Then, the configuration information selection unit 23 selects the configuration information that corresponds to a low level from the configuration information storage unit 22. The configuration information selection unit 23 sends the selected configuration information to the configuration information transmission unit 24. The configuration information transmission unit 24 sends the configuration information to the signal generation unit 10. The signal generation unit 10 operates on the basis of the sent configuration information.

The above-described encoder 1 achieves the following effects:

(1) The encoder 1 is an encoder 1 used in a numerical control device, the encoder 1 including the signal generation unit 10 configured to generate a digital signal, and the configuration information output unit 20 configured to output configuration information that determines operation of the signal generation unit 10, the configuration information output unit 20 including the voltage level acquisition unit 21 that acquires a voltage level to be input, the configuration information selection unit 23 that selects configuration information according to the acquired voltage level among a plurality of types of configuration information, and the configuration information transmission unit 24 that transmits the selected configuration information to the signal generation unit 10.

With this configuration, through merely changing the voltage level to be input, configuration information to be set in the signal generation unit 10 can be easily changed. Therefore, compared to a case where a single type of configuration information is stored in the configuration information output unit 20, it is possible to reduce the time spent changing programs and man-hours required to change steps during manufacture, and it is possible to provide the encoder 1 that is easier to use.

(2) The configuration information selection unit 23 selects configuration information that includes a number of periodic signals per rotation generated by a code disk in the encoder 1. With this configuration, the encoder 1 can be made to operate as a rotary encoder 1.

(3) The encoder 1 further includes the configuration information storage unit 22 that stores configuration information that corresponds to the voltage level to be acquired. With this configuration, there is no need to selectively store configuration information for each type of encoder 1, and configuration information for all types of encoders 1 can be stored. Therefore, there is no need to create programs including the configuration information for each type of encoder 1 and there can be provided the encoder 1 that is easier to use.

A preferred embodiment of an encoder according to the present invention has been described above, but the present invention is not limited to the above-described embodiment and may be altered as appropriate. For example, in the above-described embodiment, one configuration power source 30 is provided, but the number of configuration power sources is not limited to one. For example, a plurality of configuration power sources 30 may be provided. The voltage level acquisition unit 21 may acquire a plurality of voltage levels to be input. The configuration information selection unit 23 may select configuration information according to a combination of a plurality of voltage levels. For example, the plurality of configuration power sources 30 may be provided and binary digits may be indicated at the signal level. For example, two configuration power sources 30 may be provided and four voltage levels of 00, 01, 10, and 11 may be indicated. The configuration information selection unit 23 may select the configuration information on the basis of any one of the four voltage levels. Configuration of the signal generation unit 10 can be changed by simply increasing the number of configuration power sources 30. Therefore, it is possible to provide the encoder 1 with which settings can be changed with a simpler configuration.

In the above-described embodiment, a rotary encoder is used as an example of the encoder 1, but the encoder 1 is not limited thereto. For example, the encoder 1 may be a linear encoder.

In addition, in the above-described embodiment, the configuration information selection unit 23 selects configuration information that includes the number of slits in the circular slit plate as one example, but the configuration information selection unit 23 is not limited thereto. In other words, the configuration information may be information that includes the number of periodic signals per rotation generated by a code disc of the encoder 1. The encoder 1 is not limited to an optical encoder that counts the number of slits and may be, for example, a magnetic encoder that counts the number of periodic signals generated by a change in magnetic field.

EXPLANATION OF REFERENCE NUMERALS

1 encoder
10 signal generation unit
20 configuration information output unit
21 voltage level acquisition unit
22 configuration information storage unit
23 configuration information selection unit
24 configuration information transmission unit
30 configuration power source

What is claimed is:

1. An encoder used in a numerical control device, the encoder comprising:
a signal generation unit configured to generate a digital signal; and
a configuration information output unit connected to a configuration power source that outputs a predetermined voltage level and configured to output configuration information that determines operation of the signal generation unit,
the configuration information output unit including:
a voltage level acquisition unit that acquires a voltage level of the configuration power source;
a configuration information selection unit that selects configuration information according to the acquired voltage level among a plurality of types of configuration information; and
a configuration information transmission unit that transmits the selected configuration information to the signal generation unit.

2. The encoder according to claim 1, wherein the configuration information selection unit selects configuration information that includes a number of periodic signals per rotation generated by a code disk in the encoder.

3. The encoder according to claim 1, wherein:
the voltage level acquisition unit acquires a plurality of voltage levels to be input, and
the configuration information selection unit selects configuration information according to a combination of the plurality of voltage levels.

4. The encoder according to claim 1, further comprising a configuration information storage unit that stores the configuration information corresponding to the voltage level to be acquired.

* * * * *